April 3, 1945.    N. M. NORMAN ET AL    2,372,976
TRAILER COUPLER
Filed July 12, 1944    2 Sheets-Sheet 1

J.P.K. Fontaine
N.M. Norman
INVENTORS

BY *Henry L. Jennings*
ATTORNEY

J.P.K. Fontaine
N.M. Norman.
INVENTORS

BY Henry L. Jennings
ATTORNEY

Patented Apr. 3, 1945

2,372,976

UNITED STATES PATENT OFFICE 2,372,976

TRAILER COUPLER

Noah M. Norman and John P. K. Fontaine, Birmingham, Ala.; said Norman assignor to said Fontaine Application July 12, 1944, Serial No. 544,483

6 Claims. (Cl. 280—33.1)

This invention relates to trailer couplers of the type embodying pivoted locking jaws which are engaged by the king pin of a trailer, and has for an object the provision of an apparatus of the character designated which shall embody improved, simplified operating means, including a latch for holding the locking jaws partially open to uncouple the trailer from the vehicle by which it is drawn, which latch shall be adapted to be released responsive to uncoupling of the trailer member.

Another object of our invention is to provide a trailer coupler embodying pivoted locking jaws, together with an improved link and lever mechanism for operating the jaws when uncoupling, and which shall include an improved latch means for the lever for holding the jaws partially open when uncoupling.

Trailer couplers embodying locking jaws, pivoted to the fifth wheel of a motor vehicle and adapted to be coupled by engagement with the king pin on a trailer, have heretofore been proposed. For example, see the patent to Swift No. 2,042,079. In accordance with our invention we provide improved means for operating the locking jaws, together with operating means which couple automatically upon engagement with a king pin, and means whereby the driver of the motor vehicle may set the locking jaws partially open, drive the motor vehicle away from the trailer, and the action of the king pin on the locking jaws and their operating means, releases the latch and returns the locking jaws to their original positions ready to be coupled again.

Apparatus embodying features of our invention is illustrated in the accompanying drawings, forming a part of this application, in which Fig. 1 is a bottom plan view of the coupler mechanism;

Figure 3:
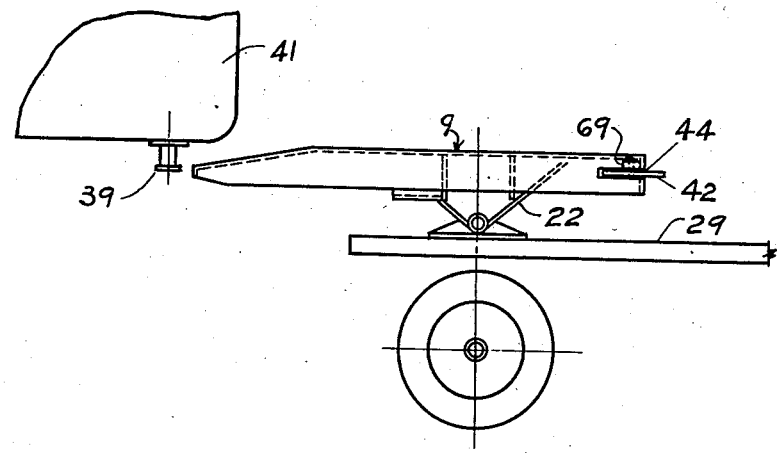
Fig. 3 is an elevational view showing the apparatus mounted on a motor vehicle ready to be coupled to a semi-trailer.

Referring to the drawings, our improved coupler includes a fifth wheel 9 made from steel plate 10 and having a flaring opening 11 at the rear. The opening 11 extends inwardly of the plate 10 to provide a relatively elongated opening 12 centrally of the plate. The central opening 12 is reinforced by means of a block 13, shaped to fit around the opening 12 and which is welded, or otherwise suitably secured to the plate 10. The outer rim of the plate 10 is reinforced by means of a flange 16 which is welded around the entire outer edge of the plate, and by flanges 17 and 18 which are welded to the sides of the flaring opening 11. A reinforcing strap 19 is welded to the sides of the block 13 and spans the opening 12. The strap 19 is provided with a downward U bend 21, where it spans the opening 12, in order that it may clear the king pin of the trailer when coupling to the motor vehicle. Also secured to the underside of the plate 10 are mounting brackets 22 and 23 which extend downwardly from the plate 10 and which are provided with bearings 24 and 26. Similar brackets 27 and 28 are mounted on the rear of the motor vehicle 29. See Fig. 3. A shaft 31 extends through the bearings described and serves to connect the fifth wheel construction described to the motor vehicle by a pivotal connection whereby it may oscillate to accommodate itself to inequalities in the highway, and relative movement of the trailer and the motor vehicle.

Pivotally mounted beneath the plate 10 by means of pins 32 and 33, one on each side of the opening 12, are locking dogs 34 and 36. The pins 32 and 33 extend downwardly through the reinforcing block 13 and the strap 19. At their inner ends, the locking dogs 34 and 36 are provided with concave faces 37 and 38, respectively, which are adapted to engage the king pin 39 on a trailer unit 41. It will be noted by reference to Fig. 1 of the drawings that the concave faces 37 and 38 are toward the inward side of the locking dogs 34 and 36, whereas the pivot pins 32 and 33 are located substantially in the long axes of the locking dogs, whereby a pull on the king pin 39 towards the flaring opening 11 causes the king pin 39 to engage the locking dogs tighter.

The locking dogs 34 and 36 are operated to uncouple them from the king pin 39 by means of a lever 42, pivotally mounted at 43 on the reinforcing block 13. The lever 42 extends outwardly of the plate 10 through an opening 44 in the flange 16 where it may be grasped by the operator when he desires to uncouple the motor vehicle from the trailer. Pivotally connected to the lever 42 at 46 are two links 47 and 48. The link 47 is connected to the locking dog 34 at 49 and the link 48 is connected to the locking dog 36 at 51. It will be seen from Fig. 1 that when the lever 42 is moved in the direction indicated by the arrow, the locking dogs 34 and 36 are moved toward open position. A spring 52 anchored at 53 on the plate 10 is connected to the lever 42 at 54, and serves to bias the lever 42 to the position shown in Fig. 1 of the drawings, with the locking jaws 34 and 36 in closed position.

Pivotally mounted on the underside of the plate 10 at 56 is a latch member 57. Springs 58 and 59 are mounted on opposite sides of the latch 57 and are connected at one end to a bar 61 bearing on the latch, and at their opposite ends to the plate 10. They thus serve to hold the latch 57 in engagement with the lever 42. The upper side of the latch 57 is provided with an inclined surface 62 which terminates in a shoulder 63 toward the outer end of the member 57. Pivotally mounted on the plate 10 at 64 is a detent 66 having a shoulder 67 thereon. A spring 68 connected to the detent 66 and to the plate 10 serves to bias the detent toward the latch 57.

Figure 2:
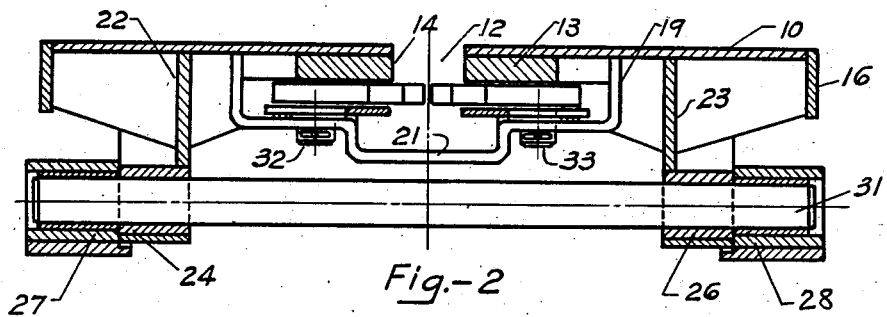
Fig. 2 is a sectional view taken along the line II—II of Fig. 1.
Figure 1:
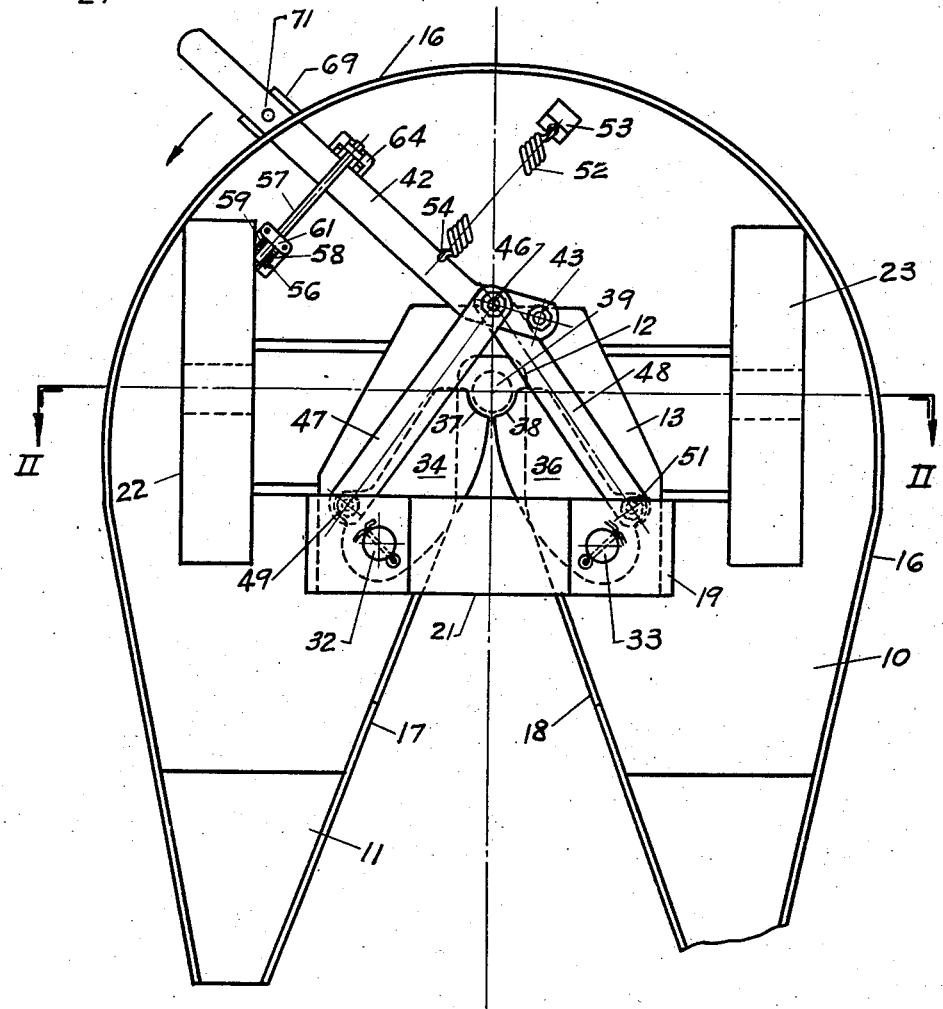
Figure 4:
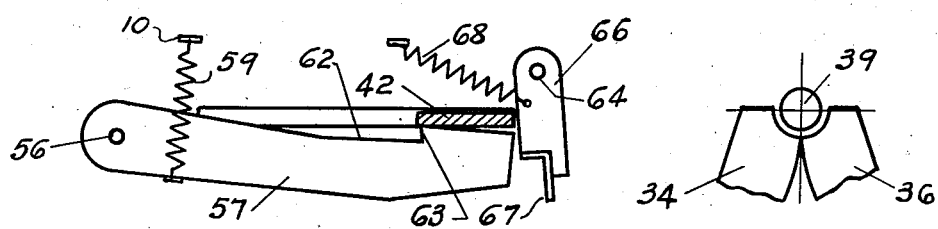
Fig. 4 is a detail view of the latch mechanism showing its position when the coupling members are in closed positions.
Figure 5:
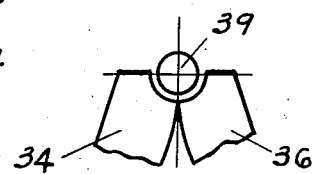
Fig. 5 is a fragmentary view showing the relative positions of the king pin and the coupling members with the latch in the position shown in Fig. 4.
Figure 6:
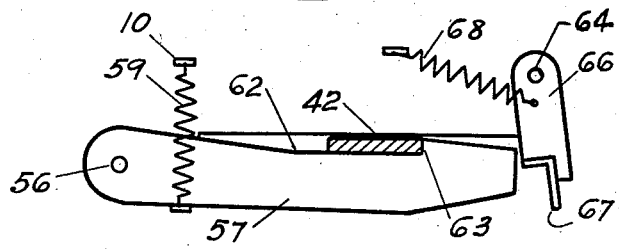
Fig. 6 is a view similar to Fig. 4 showing the position of the latch when the motor vehicle is about to be uncoupled from the trailer.
Figure 7:
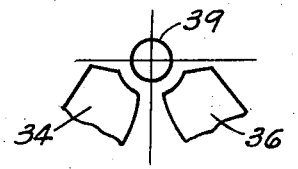
Fig. 7 is a view showing the relative positions of the coupling members and the king pin with the latch in the position illustrated in Fig. 6.
Figure 8:
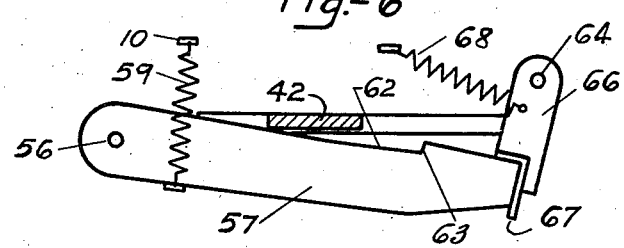
Fig. 8 is a view similar to Figs. 4 and 6 and showing the positions of the latch members when the king pin is passing between the coupling members while uncoupling the motor vehicle from the trailer.
Figure 9:
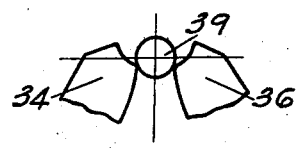
Fig. 9 is a view showing the relative positions of the coupling members and the king pin with the latch in the position shown in Fig. 8.

The latch 57, lever 42, and detent 66, are shown in Fig. 4 in their positions when the locking dogs 34 and 36 are closed, as shown in Figs. 1 and 5. Whenever it becomes necessary to uncouple the trailer from the motor vehicle, the lever 42 is moved in the direction indicated by the arrow in Fig. 1, to the position shown in Fig. 6. In this position, the lever 42 engages the shoulder 63 on the latch 57, the springs 58 and 59 pulling the latch into position to engage with the lever. In this position of the lever, the locking dogs have been partially opened as shown in Fig. 7 of the drawings. The operator of the motor vehicle may now leave the lever 42 engaged, as shown in Fig. 6, and move the motor vehicle forwardly. The king pin 39 then acts to force the locking dogs 34 and 36 apart to the position shown in Fig. 9 of the drawings. This also moves the lever 42 more to the right as seen in Fig. 8 up the inclined surface 62. This forces the latch 57 downward to the position shown in Fig. 8, in which position the spring 68 pulls the detent 66 to the left to engage the latch 57. When the king pin has cleared the locking members 34 and 36, the spring 52 pulls the lever 42 back to its starting position, the detent 66 holding the shoulder 63 on the latch 57 out of the way. When the lever 42 returns to its starting position, it strikes the detent 66 and disengages it from the latch 57 as shown in Fig. 4 of the drawings. The parts are again in position for automatic engagement with a king pin.

In order that the trailer may not become accidentally uncoupled in operation, we provide a bracket 69, on the flange 16, with a pin 71 passing down through the bracket and the lever 42. This holds the locking dogs 34 and 36 in closed positions until the pin 71 is disengaged.

From the foregoing it will be apparent that we have devised an improved trailer coupler which is sturdy and simple of design, and which includes means whereby the coupling members may be set partially open in order to uncouple a trailer and will return automatically to their initial positions when the trailer is uncoupled.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a coupler of the character described, locking dogs movable into coupling and uncoupling positions, a lever for moving the locking dogs toward said positions, a spring for biasing the lever toward coupling position, a latch spanning the lever and having a notch on one side adapted to engage the lever at an intermediate position, a detent for engaging the latch and holding it with the notch out of the way of the lever, and an inclined surface on the latch adapted to be engaged upon movement thereof from the notch toward uncoupling position to move the latch into position to be engaged by the detent.

2. In a mechanism for coupling a trailer unit to a motor vehicle including a king pin on the trailer adapted to be engaged upon impact by coupling members carried by the motor vehicle, a lever operatively connected to the coupling members to open and close them, a spring for biasing the lever towards its position for closing the coupling members, a latch spanning the lever and having a notch therein for engaging the lever and holding it in an intermediate position with the coupling members partially open, said coupling members being adapted to be further opened by engagement with the king pin in a parting movement between the motor vehicle and the trailer, an inclined surface on the latch adapted to be engaged by the lever upon further movement thereof responsive to further opening of the coupling members, whereby the lever moves the latch with its notch outside the plane of movement of the lever, and a detent disposed to engage the latch when so moved and to hold it outside the plane of movement of the lever and to be engaged by the lever upon return movement in a closing direction to release the latch.

3. In a coupler of the character described, locking dogs movable into coupling and uncoupling positions, a lever for moving the locking dogs toward said positions, a spring for biasing the lever toward coupling position, a latch extending across the lever and adapted to engage it at an intermediate point in its movement toward uncoupling position, a detent disposed to engage the latch upon further movement of the lever toward uncoupling position and hold the latch out of the way of the lever, and to be disengaged from the latch upon return movement of the lever.

4. Apparatus as defined in claim 1 in which the detent is engaged by the lever and released upon return movement of the lever.

5. In mechanism for coupling a trailer unit to a motor vehicle unit including a fifth wheel on one of said units having an elongated opening therein to receive a king pin on the other unit, a pair of locking dogs pivotally mounted under the fifth wheel on opposite sides of said opening and adapted to engage the king pin and hold the units coupled, a lever for opening the locking dogs, a spring biasing the lever in a direction to close the locking dogs, a spring pressed latch extending across the lever and having a notch therein adapted to engage the lever at an intermediate point in its opening movement with the locking dogs partially open, cam means engageable by the lever upon further opening movement thereof to move the latch to a position with the notch out of the path of movement of the lever, and a detent adapted to engage and hold the latch in said last-mentioned position and disposed to be struck by the lever upon return movement and to be disengaged from the latch.

6. In mechanism for coupling a trailer unit to a motor vehicle unit including a fifth wheel on one of said units having an elongated opening therein to receive a king pin on the other unit, a pair of locking dogs pivotally mounted under the fifth wheel on opposite sides of said opening and adapted to engage the king pin and hold the units coupled, a lever for opening the locking dogs, a spring biasing the lever in a direction to close the locking dogs, a latch spanning the lever and including means for engaging the lever and holding it in position with the locking dogs partially open, means included in the latch and disposed to be engaged by the lever upon further movement thereof toward opening the locking dogs to move the latch out of the way of the lever, and a detent disposed to engage the latch when the locking dogs are in wide open position and hold it out of the way of return movement of the lever.

NOAH M. NORMAN.
JOHN P. K. FONTAINE.